(12) United States Patent
Cubillo

(10) Patent No.: US 9,106,799 B2
(45) Date of Patent: Aug. 11, 2015

(54) TRANSACTION WIDGETS

(75) Inventor: Pedro Antonio Cubillo, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1027 days.

(21) Appl. No.: 11/600,951

(22) Filed: Nov. 16, 2006

(65) Prior Publication Data

US 2008/0120658 A1    May 22, 2008

(51) Int. Cl.
| | |
|---|---|
| *H04N 21/478* | (2011.01) |
| *H04N 7/173* | (2011.01) |
| *H04N 21/254* | (2011.01) |
| *G06Q 30/06* | (2012.01) |
| *H04N 21/235* | (2011.01) |
| *H04N 21/2543* | (2011.01) |
| *H04N 21/2547* | (2011.01) |
| *H04N 21/258* | (2011.01) |
| *H04N 21/435* | (2011.01) |
| *H04N 21/81* | (2011.01) |
| *H04N 5/445* | (2011.01) |

(52) U.S. Cl.
CPC ........... *H04N 7/17318* (2013.01); *G06Q 30/06* (2013.01); *H04N 21/235* (2013.01); *H04N 21/254* (2013.01); *H04N 21/2543* (2013.01); *H04N 21/2547* (2013.01); *H04N 21/25875* (2013.01); *H04N 21/435* (2013.01); *H04N 21/478* (2013.01); *H04N 21/4781* (2013.01); *H04N 21/47815* (2013.01); *H04N 21/8173* (2013.01); *H04N 2005/4456* (2013.01); *H04N 2005/44565* (2013.01)

(58) Field of Classification Search
CPC ........... H04N 2005/4456; H04N 2005/44565; H04N 21/2542; H04N 21/254; H04N 21/478; H04N 21/4781; H04N 21/47815; H04N 21/4784
USPC ......... 725/135, 110, 105, 131, 100, 138, 139, 725/151, 147, 144, 114; 398/49, 73, 60; 713/153
See application file for complete search history.

(56) References Cited

U.S. PATENT DOCUMENTS

| | | | |
|---|---|---|---|
| 6,172,677 B1 * | 1/2001 | Stautner et al. | 715/716 |
| 6,480,748 B1 * | 11/2002 | Gerszberg et al. | 700/21 |
| 6,918,131 B1 * | 7/2005 | Rautila et al. | 725/34 |
| 6,922,843 B1 * | 7/2005 | Herrington et al. | 725/30 |
| 7,380,218 B2 * | 5/2008 | Rundell | 715/808 |
| 2001/0010095 A1 * | 7/2001 | Ellis et al. | 725/44 |
| 2001/0029487 A1 * | 10/2001 | Kwon | 705/41 |
| 2001/0036853 A1 * | 11/2001 | Thomas | 463/17 |
| 2001/0037293 A1 * | 11/2001 | Hindman et al. | 705/39 |
| 2002/0072974 A1 * | 6/2002 | Pugliese et al. | 705/14 |
| 2002/0143627 A1 * | 10/2002 | Barsade et al. | 705/14 |
| 2003/0092479 A1 * | 5/2003 | Weil et al. | 463/17 |
| 2004/0060064 A1 * | 3/2004 | Poli | 725/61 |
| 2004/0117831 A1 * | 6/2004 | Ellis et al. | 725/53 |
| 2004/0153364 A1 * | 8/2004 | Natsubori | 705/14 |
| 2005/0014552 A1 * | 1/2005 | Packes et al. | 463/17 |
| 2005/0028206 A1 * | 2/2005 | Cameron et al. | 725/46 |
| 2005/0181875 A1 * | 8/2005 | Hoehne et al. | 463/41 |

(Continued)

*Primary Examiner* — Robert Hance

(57) ABSTRACT

A content processing device is configured to receive data requested according to a specified parameter and also to receive an incoming video signal, and is further configured to receive a request to purchase at least one item after providing a data interface and at least a subset of the requested data for display on a video display.

21 Claims, 5 Drawing Sheets

(56) References Cited

U.S. PATENT DOCUMENTS

| | | | |
|---|---|---|---|
| 2006/0015897 A1* | 1/2006 | Kim | 725/33 |
| 2006/0135255 A1* | 6/2006 | Roth | 463/25 |
| 2006/0190966 A1* | 8/2006 | McKissick et al. | 725/61 |
| 2006/0282319 A1* | 12/2006 | Maggio | 705/14 |
| 2007/0174440 A1* | 7/2007 | Brier et al. | 709/223 |
| 2007/0197279 A1* | 8/2007 | Packes et al. | 463/17 |
| 2007/0198432 A1* | 8/2007 | Pitroda et al. | 705/64 |
| 2007/0283384 A1* | 12/2007 | Haeuser et al. | 725/34 |

* cited by examiner

TRANSACTION WIDGETS

BACKGROUND INFORMATION

Current video programming sometimes provides a "crawl" across the bottom of a video screen. A crawl may provide information in textual format such as news, weather, traffic information, sports scores, etc. Sometimes current video programming provides the opportunity to purchase goods and/or services described in a crawl, or perhaps more often through a dedicated video channel. In any event, information to be displayed concerning goods and/or services available for purchase is chosen by a video programmer, and cannot be controlled by a user or viewer of the video.

Further, users presently do not have ways of interacting with video images or text provided in a portion of a video screen along with a main video image. For example, at present, through images or text provided on a video screen, a user may be presented with the opportunity to complete a transaction such as purchasing goods or services, but the user has no way to complete the transaction other than by calling a provided telephone number, accessing a provided website, etc. Accordingly, at present, users are inconvenienced when attempting to complete transactions, and providers of transactions lose opportunities to complete transactions when users become frustrated or impatient with the difficulties and inconveniences they experience in attempting to complete desired transactions.

DETAILED DESCRIPTION OF PREFERRED EMBODIMENTS

Figure 1A:
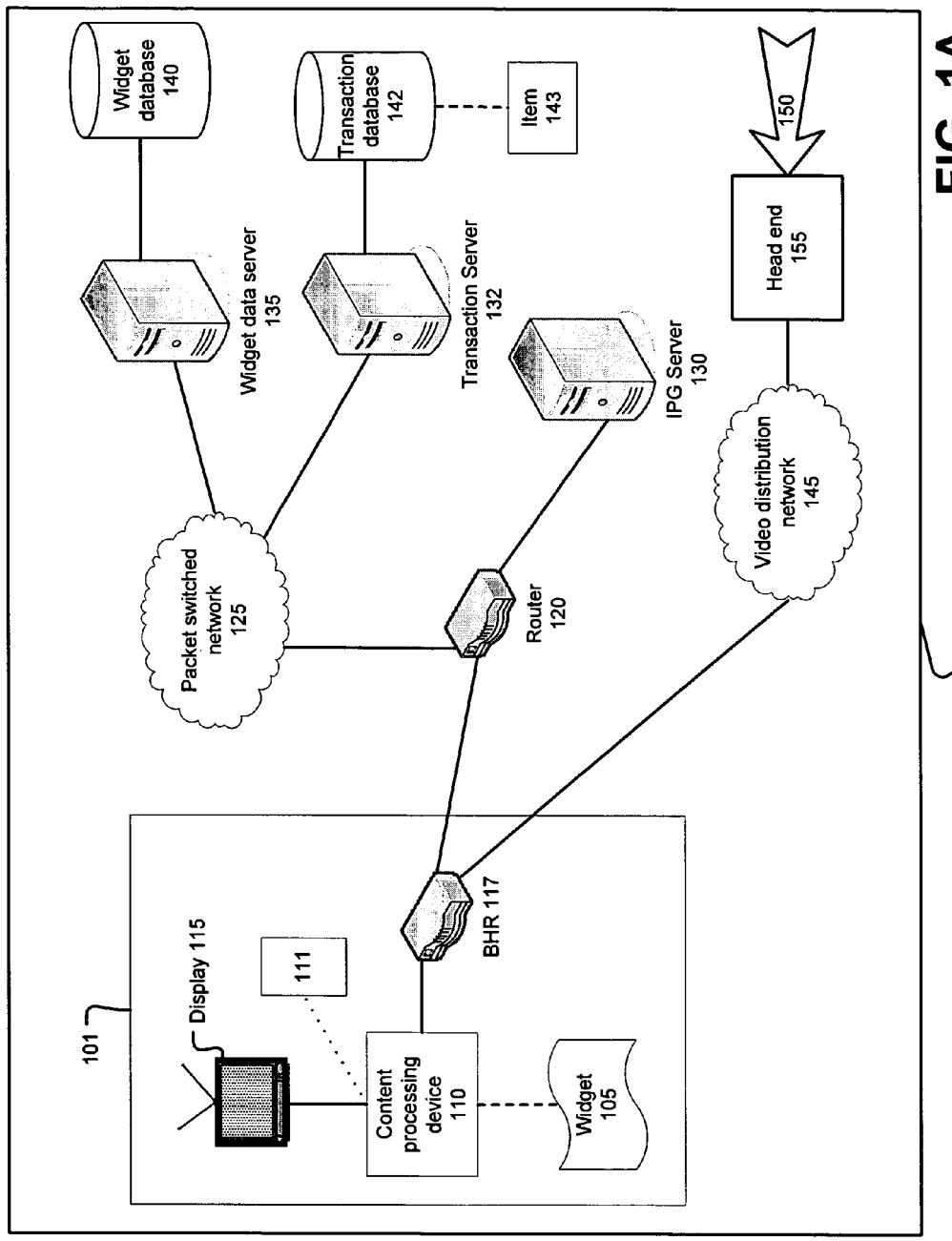
FIG. 1A illustrates an exemplary system for delivering video and for providing transactions using widgets.

FIG. 1A illustrates an exemplary system 100 for delivering a video signal 150 and for displaying information and supporting transactions according to instructions included in a widget 105.

As illustrated in FIG. 1A, a customer premise 101 includes a content processing device 110, which may be controlled by a user through a control 111, to view video on a video display 115. Content processing device 110 may be a set top box (STB) or similar device known for receiving a video signal from a network and for providing video programming to video display 115.

Widget 105 includes computer-executable instructions that are generally stored in a memory of content processing device 110, and that may be executed by a processor included within content processing device 110. Instructions in widget 105 may include instructions for retrieving data from, and conducting a transaction through, transaction server 132. To retrieve such data and conduct a transaction, a user may provide input through control 111. Further, instructions in widget 105 may include instructions for retrieving data from data server 135, illustrated as a widget data server, sometimes according to input provided by a user through control 111. In addition, embodiments are possible in which a memory of content processing device 110 stores more than one widget 105, e.g., a first widget 105 for communicating with transaction server 132, and a second widget 105 for communicating with data server 135. Moreover, embodiments including additional widgets 105, or a single widget 105 communicating with other servers, are also possible.

Control 111 is generally a remote control that selectively communicates with content processing device 110 through known wireless communications, such as infrared (IR) or radio frequency (RF) communications. Control 111 generally includes numeric keys for selecting channels of video programming, as well as other keys for making selections and request according to menus provided on video display 115, in addition to arrow keys and the like for changing channels, changing volume, etc. Video display 115 may be a television receiver such as is known, including a conventional television or a high definition television (HDTV).

Content processing device 110 selectively communicates, via a broadband home router (BHR) 117, with a gateway router 120 to send information to, and receive information from, a packet switched network 125. An interactive program guide (IPG) server 130 also selectively communicates with content processing device 110 through router 120, sometimes via network 125, although such communications do not occur through network 125 in the exemplary system illustrated in FIG. 1A.

Transaction server 132 selectively communicates with content processing device 110 via network 125 and/or router 120. Transaction server 132 is what is sometimes referred to as an e-commerce server and is known for processing and responding to requests to purchase items and/or services, including providing confirmation messages to purchasers, updating order fulfillment systems, processing credit cards payments, etc. Further, transaction server 132 may include, or, as illustrated in FIG. 1A, may be in selective communication with, a transaction database 142. Database 142 may include a catalog of items 143, i.e., goods and/or services that a user may purchase through transaction server 132. It is to be understood that the term "purchase" is intended to be read broadly herein. For example, a purchase transaction of item 143 using transaction server 132 could include a rental, a lease, and in-kind transaction, etc. Transaction server 132 is generally programmed to provide information about and receive orders for item 143, and also to provide confirmation of such orders once they have been received.

A widget data server 135 is also in selective communication with content processing device 110, generally via network 125 and/or through router 120. A widget database 140 may be included within widget data server 135, or may be part of a separate computing system. In any event, widget data server 135 is generally configured to selectively retrieve information from widget database 140 in response to requests for data to be included in the display of a widget 105 in display 115. Widget data server 135 and widget database 140 are optional, and may be omitted in some embodiments.

A video distribution network 145 is a network for providing a video signal 150 such as is known. For example, network 145 may include hardware and software for providing video signal 150 via coaxial cable and/or fiber optic cable. As is known, video signal 150 is generally provided to a video distribution network 145 from a head end 155.

Packet switched network 125 is generally an internet protocol (IP) network. As such, network 125 uses known protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. As is known, packet switched network 125, may be used to transport a variety of data, including multimedia data such as audio and video. Accordingly, it is to be understood that embodiments are possible in which networks 125 and 145 are in fact combined into a single network, or in which video distribution network 145 is simply omitted, whereby packet switched network 125 is used to provide video signal 150 to content processing device 110.

BHR 117 is known for distributing audio, video, and data to devices within customer premises 101 such as content processing device 110. For example, in one embodiment, BHR 117 is the broadband home router or wireless broadband home router from Actiontec Electronics, Inc. of Sunnyvale, Calif.

Gateway router 120 is known for routing data packets in packet switched network 125. Gateway router 120 allows content processing device 110 to access packet switched network 125. By communicating with router 120, content processing device 110 is able to obtain a network address such as an internet protocol (IP) address, thereby enabling content processing device 110 to make requests to and to receive data from, servers 130 and 135.

IPG server 130 provides an interactive program guide to content processing device 110 for display on video display 115. As is known, an interactive program guide allows viewers of display 115 to obtain information and to select content, generally by navigating and making selections using control device 111. IPG server 130 generally includes a processor and a memory, as well as a computer readable medium such as a disk for storing data, e.g., interactive program guide data, to be provided to content processing device 110.

Transaction server 132 and widget data server 135 are computing devices each including a processor and a memory, as well as a computer readable medium for storing data. Embodiments are possible in which transaction server 132 and widget data server 135 are included within a single computing device. As mentioned above, widget data server 135 selectively communicates with widget data base 140 to obtain data to be displayed in widget 105 upon the request received from content processing device 110. Widget database 140 may be included on a computer readable medium within widget data server 135, or may be a separate database. Transaction server 132 selectively communicates with transaction database 142 to obtain items 143 and to obtain and store other data necessary to complete a transaction. Transaction database 142 may be included on a computer readable medium within transaction server 132, or may be a separate database. Further, embodiments are possible in which widget database 140 and transaction database 142 are included within a single computing device or within a single instance of a relational database.

Figure 1B:
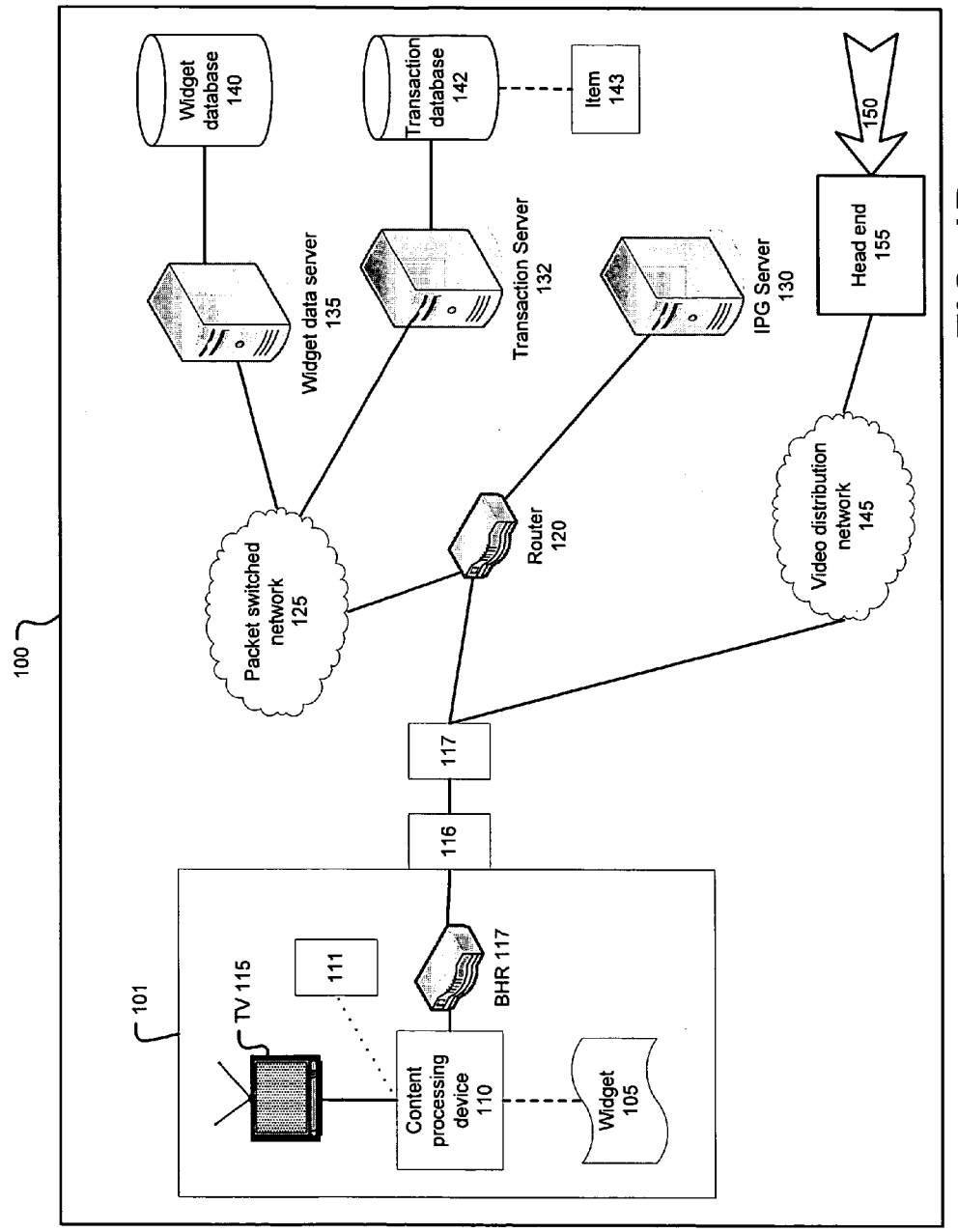
FIG. 1B illustrates another exemplary system for delivering video and for providing transactions.

FIG. 1B illustrates another exemplary system for delivering video signal 150 and data, including widget 105, to content processing device 110. As can be seen, FIG. 1B illustrates all of the elements illustrated in FIG. 1A, with the addition of optical line terminal (OLT) 117 and optical network terminal (ONT) 116. Accordingly, FIG. 1B illustrates an exemplary system in which fiber optic cable is used to provide both data and video signal 150 to customer premises 101, including to content processing device 110. As is known, OLT 117 may serve as a terminus for an optical network or an optical line. OLT 117 may provide data, including video signal 150, to one or more ONT's 116. ONT 116 can be situated adjacent to customer premise 101, for the purpose of providing data received over an optical line to customer premise 101, including content processing device 110. Accordingly, FIG. 1B illustrates a hybrid network system 100 in which video signal 150 transported over video distribution network 145 and data transported over packet switched network 125 are received by customer premises 101 through a fiber optic line.

Computing devices such as content processing device 110, IPG server 130, transaction server 132, widget data server 135, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art. Content processing device 110 generally is a specialized device for receiving video signals 150 from head end 155 via network 145, and may be provided with a proprietary or specialized operating system other than those enumerated above. For example, in one embodiment, content processing device 110 is an STB provided with a real time operating system (RTOS) such as is known. However, it is to be understood that content processing device 110 may be a computing device such as one of those enumerated above, so long as the computing device is capable of receiving video signals 150 from network 145, and also is capable of storing an executing the instructions included in widget 105.

Computing devices such as content processing device 110, etc. generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media wherein the medium is not a signal. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
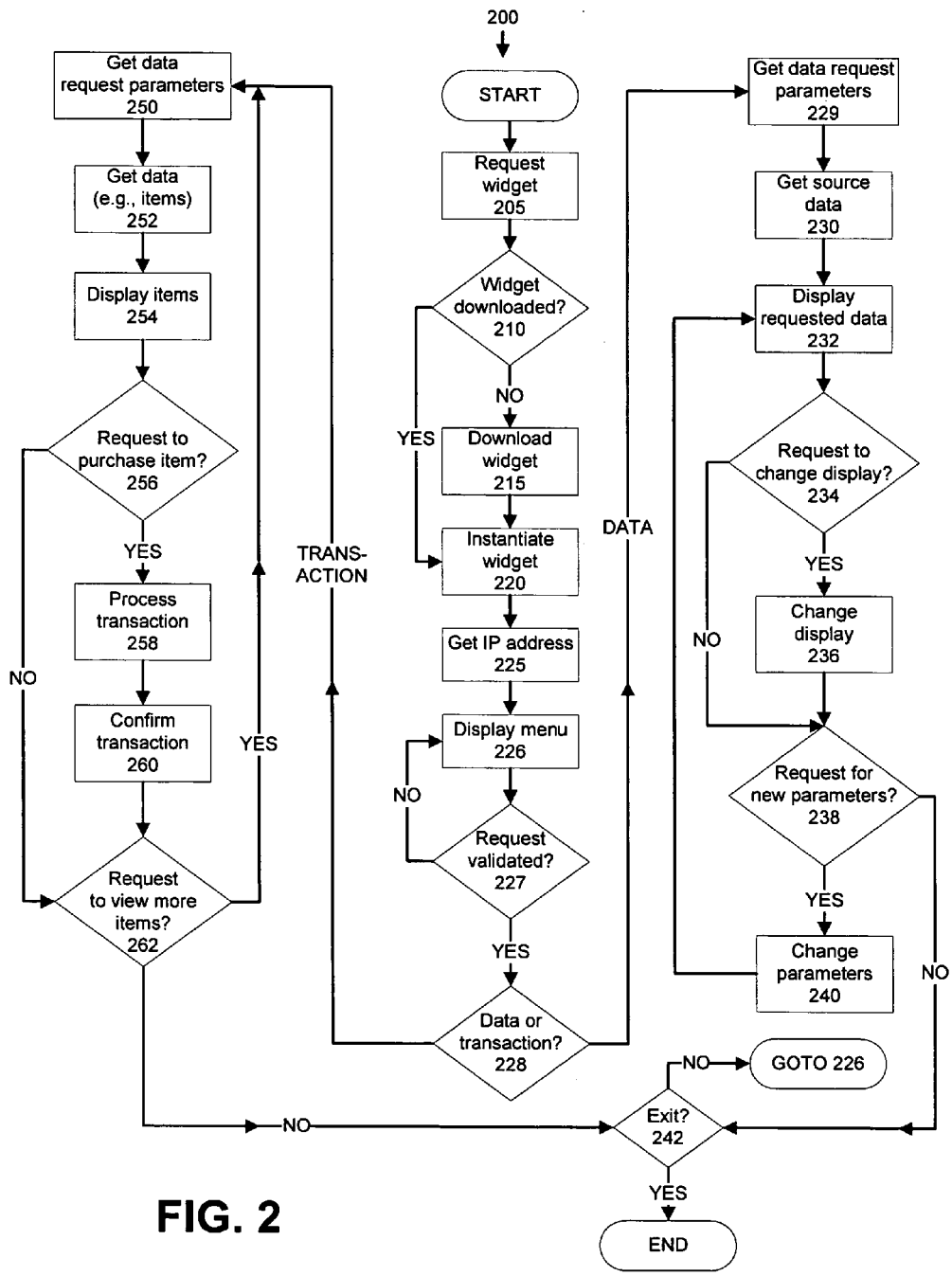
FIG. 2 illustrates an exemplary process for providing and accessing widgets in a video display.

FIG. 2 illustrates an exemplary process 200 for providing widget 105 in video display 115. As noted above, embodiments are possible that include multiple widgets 105. Thus, although process 200 is discussed with respect to a single widget 105, it is to be understood that process 200 could be applied in embodiments including more than one widget 105. For example, an embodiment could include a first widget 105 that includes instructions for providing data retrieved from widget data server 135, and a second widget 105 that includes instructions for displaying information about items 143 and for supporting transactions through transaction server 132.

In step 205, a user selects a key or button on control device 111 to communicate to content processing device 110 a request for widget 105. Content processing device 110 may be programmed to interpret input from a particular button or key or keys on control device 111 as a request for widget 105, or widget 105 may be selected according to a menu or other option presented in an interactive program guide (IPG) or other user interface displayed on video display 115.

Next, in step 210, content processing device 110 makes a determination as to whether instructions for displaying widget 105 are stored in a computer readable medium within content processing device 110. If not, process 200 proceeds to step 215. However, if instructions for widget 105 are stored within content processing device 110, then step 220 is next executed.

Next, in step 215, content processing device 110 communicates with IPG server 130 through router 120 to download computer executable instructions for providing widget 105. Because memory or storage within content processing device 110 may be limited, computer executable instructions for widget 105 preferably do not consume large amounts of memory. For example, in one embodiment, computer executable instructions for widget 105, written in the JAVA™ programming language, consume roughly 150 kilobytes of memory.

Next, in step 220, widget 105 is instantiated by content processing device 110. Accordingly, instructions are executed by a processor within content processing device 110 to provide content according to widget 105 on video display 115.

Next, in step 225, content processing device 110 obtains an internet protocol (IP) address from IPG server 130. This step allows content processing device 110 to be able to request and send information for widget 105 to and from transaction server 132 and/or widget data server 135.

Next, in step 226, content processing device 110, according to instructions in widget 105, presents a menu in video display 115. The menu presented in this step generally allows a user to select, through control device 111, various functionality that may be available through widget 105. For example, widget 105 may be able to obtain data through data server 135, or widget 105 may be able to offer item 143 for purchase by accessing transaction server 132 and obtaining data about one or more items 143. Accordingly, menu items presented in step 226 may present a user with options to access these various functions, and possibly other functions, one widget 105.

Next, in step 227, content processing device 110 has determined whether input has been received from a user, e.g., through control device 111, which is sufficient to validate the right of the use to access some or all of the functionality presented in the menu presented in step 226. Step 227 is appropriate when functionality should be restricted from certain users. For example, parents may find it desirable to be able to restrict the kinds of information, or the kinds of transactions, that their children can access. Accordingly, in step 227 content processing device 110 may receive and attempt to validate a password established by a parent to confirm that the parent, and not an unauthorized child, is seeking to conduct a transaction. Such validation may occur by checking a list of user names and/or passwords stored in content processing device 110, one of databases 140 or 142, etc. If the user is validated in step 227, then step 228 is executed next. Otherwise, process 200 may return to step 226, or process 200 may terminate.

In step 228, content processing device 110 receives input from a user, e.g., through control device 111, indicating functionality to be accessed in widget 105, e.g., according to the menu presented as described with reference to step 226 above. According to the received input and instructions included in widget 105, content processing device 110 determines what functionality of widget 105 a user has requested. For example, if a user has requested to retrieve information, step 229 is executed next. However, if a user has requested to view one or more items 143 that may be the subject of a transaction, e.g., a purchase, step 250 is executed next.

It should be understood that embodiments are possible in which steps 226 and 227 are omitted. For example, in embodiments omitting data server 135, in including only transaction server 132, steps 226 and 227 would not be necessary.

Next, in step 229, content processing device 110 receives parameters from a user, e.g. via control device 111, according to which data is to be requested from data server 135. For example, instructions in widget 105 may cause a form or the like to be displayed in display 115 into which a user may enter information such as a zip code, a stock symbol, the name of a sports team, etc. Step 229 is optional. Parameters for retrieving data from data server 135 could be predetermined and included in instructions and widget 105, or pre-stored in content processing device 110, e.g., as described below.

Next, in step 230, content processing device 110 obtains source data for widget 105 from widget data server 135, according to parameters provided in step 229 if step 229 is included in process 200. In general, widget data server 135 obtains the requested data for widget 105 from widget data base 140. In some embodiments, widget data base 140 is provided with data from data vendors such as Traffic.com of Wayne, Pa.; TeleAtlas (TANA) with North American Headquarters in Lebanon, N.H.; Weather.com owned by Landmark Communications, Inc., of Norfolk, Va.; Accuweather of Fort Washington, Pa.; etc. Such vendors provide, for example, real time or near real time news, weather, traffic information, sports scores, etc.

One or more of the forgoing categories of information, or other categories of information, may be requested for widget 105 by a user accessing content processing device 110 via control device 111. For example, in one embodiment, information concerning lottery results, such as winning ticket numbers and the like, may be requested by content processing device 110. Other information such as movie schedules, theater schedules, schedules for sporting events, etc. may also be provided.

Data in step 230 is generally requested according to a parameters such as a location associated with content processing device 110. For example, in some embodiments, a postal code such as a zip code is stored on a computer-readable medium attached to content processing device 110 when content processing device 100 is installed at customer premises 101. The postal code may then be used as a parameter of a query from content processing device 100 to widget data server 135 to obtain source data for widget 105 in step 230, whereby the data obtained is relevant to the location specified for content processing device 110. Alternatively, if widget 105 is downloaded to content processing device 110 after content processing device 110 had been installed in customer premises 101 as described with respect to step 215, then a user may be prompted to provide a location, e.g., a zip code, by providing input through control 111.

Further, it should be understood that parameters other than a location could be used by content processing device 110 to request information, such as the name of a sports league, a stock symbol, etc. In embodiments in which users can purchase items 143 such as lottery tickets as described below, users may request information about such items 143. For example, parameters entered in step 230 for a request to list winning lottery numbers may include identification of a specific lottery, a drawing on a specific date, etc. If provided by a user, parameters such as the foregoing are generally provided as described above with reference to step 229.

Figure 3A:
FIGS. 3A-3D illustrate exemplary interfaces and an exemplary video display including widgets.
Figure 3B:
Figure 3C:
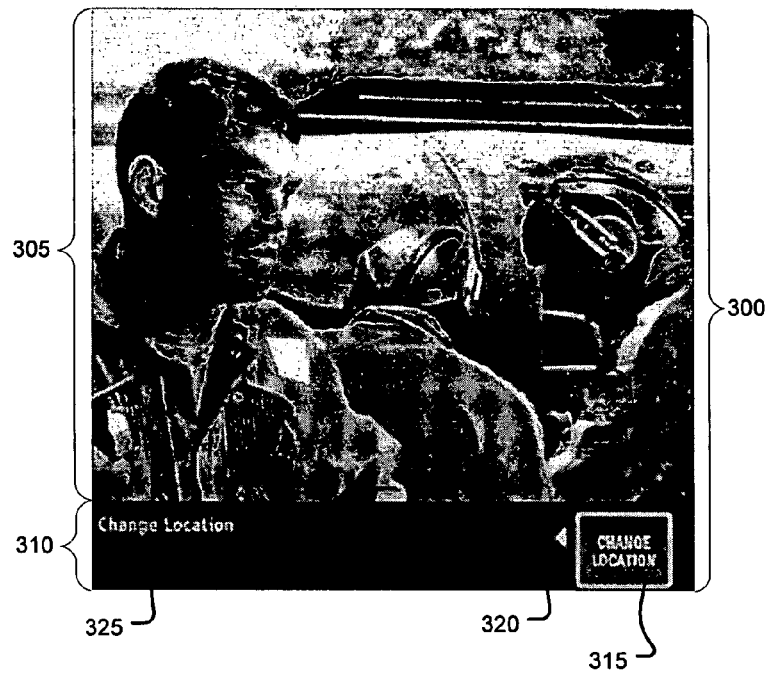

Next, in step 232, widget 105 is presented in video display 115 along with images representing video signal 105. It should be understood that widget 105 may be presented within display 115 in a variety of ways. For example, FIG. 3A illustrates an exemplary video presentation 300, such as might be seen in video display 115 after widget 105 is instantiated. Video signal 150 is displayed as a moving image 305. Widget 105 is displayed in a widget data interface 310, which includes a widget icon 315, a widget navigation arrow 320, and widget text 325. Widget icon 315 is used to provide an indication of the kind of information being displayed in widget data interface 310. Navigation arrow 320 is used to navigate to different displays of information in widget data interface 310, as is further described herein below. Widget text 325 is used to provide information to a user of video display 115.

Next, in step 234, content processing device 110, according to instructions for widget 105, determines whether a request has been received to change widget data interface 310. Such a request may be received according to input received through control device 111, e.g., by selecting navigation arrow 320 with arrow keys or other keys and pressing an "ok" button or the like. Further, widget data interface 310 could include a menu for selecting options for display within widget data interface 310. For example, widget data interface 310 could present in one portion a list of categories of information, e.g. news, sports, weather, traffic, which a user could scroll through using control device 111 to view and select from such categories.

In step 236, content processing device 110, according to instructions provided by widget 105, changes the information displayed in widget data interface 310 according to a request to change the display of such information received from a user in step 234. For example, if a user has selected navigation arrow 320, widget data interface 310 may display a new category of information according to a predetermined order for displaying categories of information in widget data interface 310. For example, widget 105 could be programmed to first display information relating to weather, then to traffic, then to news, and then to sports. Alternatively, widget 105 could be programmed to first provide information relating to traffic, and then to weather, and then to display information relating to news and sports only if users selected these categories of information from a menu. In short, different ways of allowing users to select information for display in widget data interface 310 are possible and contemplated.

In step 238, content processing device 110 determines whether a request to display in widget data interface 310 information relating to a new parameters, e.g. a new location, has been received from a user of control device 111. Such request may be received by a user selecting a predetermined button or key on control device 111, or by the user selecting a "change parameter" icon such as the "change location" icon provided in widget data interface 310, although such a change location icon is not shown as part of the illustration of widget data interface 310 herein. In one embodiment, once a user has indicated a desire to specify a new location, a user may specify such new location by entering a zip code using a numeric keypad on control device 111. A zip code as a way of specifying location for display of data by widget 105 has the advantages of being easily entered using a numeric keypad and also providing a relatively high degree of geographic specificity.

If a request for new parameters has been received in step 238, step 240 is executed next. Otherwise, step 242 is executed next.

In step 240, content processing device 110, according to instructions of widget 105, provides information related to the new parameters, e.g., new location, specified in step 238 in widget data interface 310. Generally, display of such new information requires content processing device 110 to request such new data from widget data server 135. Such request may be made in a manner similar to that discussed above concerning step 230. Following step 240, process 200 returns to step 232.

In step 242, content processing device 110 determines whether a request has been received from a user of control device 111 to exit widget 105. For example, such request may be received according to a predetermined key of control device 111, or according to an "exit" icon included within widget data interface 310, as described above. If such request has been received, then process 200 ends. Otherwise, process 200 returns to step 226.

As noted above, if, in step 227, a user has requested to view items 143 that may be the subject of a transaction, e.g., a purchase, step 250 is executed next.

Step 250 is similar to step 229 described above. In step 250, content processing device 110 receives parameters from a user, e.g. via control device 111, according to which data is to be requested from transaction server 132. For example, instructions in widget 105 may cause a form or the like to be displayed in display 115 into which a user may enter information such as a search request for items 143, or display 115 may provide, according to instructions in widget 105, a menu of items 143 or categories of items 143 that a user may view. Items 143 or categories of items 143 may be associated with numbers that users may easily select or enter using control 111. Users may also scroll to menu selections using arrow keys provided on control 111. Step 229 is optional. Parameters for retrieving data from transaction server 132 could be predetermined, or pre-stored in widget 105.

Next, in step 252, data, e.g., information concerning one or more items 143, as requested in step 250, are obtained by content processing device 110 as a result of a query sent to transaction server 132. Transaction server 132 generally obtains such data from transaction database 142.

Figure 3D:
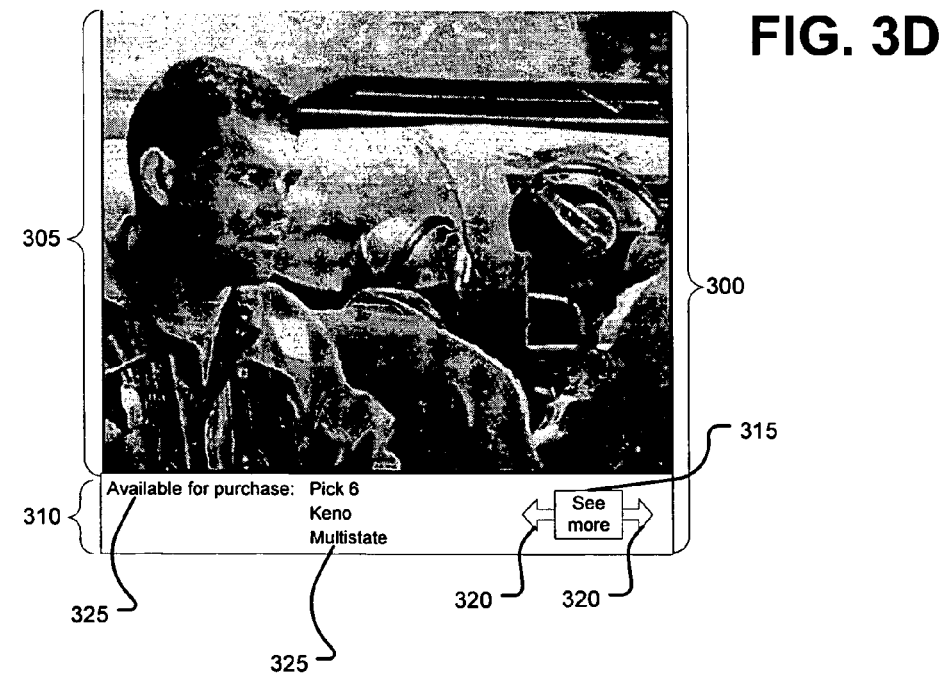

Next, in step 254, data, e.g., information concerning one or more items 143 obtained in step 252, are provided for display 115 according to instructions in widget 105. Data interface 310 and display 115 may include a list of items 143 available for purchase. For example, as illustrated in FIG. 3D, in an embodiment, items 143 include lottery tickets, and display 115 lists different kinds of lottery tickets available for purchase. Using control 111, a user may navigate to different items 143, e.g., different kinds of lottery tickets, and select one or more items 143 for purchase. Further, a user could select an item 143 to obtain more information about the item 143, which could cause content processing device 110 to make another query to transaction server 132, or which could result in content processing device 110 providing information already downloaded from transaction server 132. In any event, a display of further information about the item 143 in display 115 will generally also present the user with the opportunity to purchase the item 143, e.g., by selecting a menu item, a button, or the like in data interface 310.

Although process 200 is described with respect to the example of a user purchasing lottery tickets using widget 105, is to be understood that many different kinds of goods and/or services could be the subject of a transaction using widget 105 in transaction server 132. For example theater tickets, movie tickets, tickets to sporting events, clothing, etc. could all be items 143 that are the subject of such a transaction.

Next, in step 256, content processing device 110 determines whether a user has input a request to purchase an item 143 displayed in step 254, e.g., by interacting with data interface 310 as described above with respect to step 254. If so, process 200 proceeds to step 258. If not, process 200 proceeds to step 262.

Next, in step 258, content processing device 110 submits to transaction server 132 the request of a user, input as described above with respect to step 256, to purchase an item 143. Upon receiving such request, which may include payment information input by a user, or may include payment information for the user that has been stored in a memory of content processing device 110, transaction server 132 processes the payment information, e.g., conducts a credit card transaction, and submits the order for item 143 to database 142. It is also possible for the request to include an identifier for the user and no payment information. In this case, the request may be associated with payment information that has previously been stored in transaction server 132 and/or transaction database 142 for the user. For example, embodiments are possible in which an invoice or line item for a purchase submitted in step 258 is added to a customer's monthly bill for video, data, and other services received through content processing device 110. Transaction server 132 may be programmed to communicate with a billing system or other system as appropriate to effect the inclusion of such a line item or invoice in a customer's monthly bill.

Next, in step 260, transaction server 132 sends a transaction confirmation to content processing device 110, which, according to instructions included in widget 105, displays such transaction confirmation in data interface 310 of display 115. Further, a transaction confirmation may be sent to a user in other ways. For example, a user may have been prompted to provide an e-mail address, a telephone number, or the like, or such information may be pre-stored in content processing device 110, transaction server 132, transaction database 142, etc. Accordingly, transaction server 132 may send an e-mail to the pre-stored e-mail address, or may cause a phone call to be made to a pre-stored telephone number, etc. that confirms the transaction requested in step 256. Following step 260, step 262 is executed. Step 260 is optional but desirable for providing assurance to a user that a transaction was processed.

In step 262, content processing device 110 determines whether a user has entered a request to view items 143 in addition to the items 143 displayed in step 254 as described above. If so, process 200 returns to step 250. Otherwise, process 200 proceeds to step 242, for determination of whether a user has entered a request to exit.

CONCLUSION

Co-pending application Ser. No. 11/600,353, filed the same day as the present application, assigned to the assignee of the present application, and entitled "INTERACTIVE DATA WIDGETS FOR VIDEO" is hereby incorporated herein by reference in its entirety.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a content processing device that is in selective communication with a remote computing device and a transaction server via a packet switched network, the content processing device being configured to:
receive a request for a widget via a control device;
determine whether computer executable instructions for providing the widget are stored locally in a computer readable medium;
download computer executable instructions for providing the widget when the instructions are not stored locally, the instructions being downloaded from a remote computing device via the network;
receive an incoming video signal including television programming;
provide a menu of user-selectable options from the widget to a video display along with images representing the television programming, the menu of user-selectable options including an option to access lottery services;
receive a selection of the option to access lottery services via the control device;
request lottery information from a remote computing device, the request including location information associated with the content processing device;
verify access to the lottery information based in part on a list of authorized users;

receive lottery information from the remote computing device in response to the request, the lottery information including lottery results and an option to purchase lottery tickets; and display the images representing the television programming in a first portion of the video display and the lottery information including the lottery results and the option to purchase lottery tickets in a second portion of the video display, wherein the option to purchase lottery tickets is displayed while the lottery results are displayed.

2. The system of claim 1, further comprising a fiber optic cable that is used to transmit the data and the video signal to the content processing device.

3. The system of claim 1, wherein the content processing device is further configured to:

receive a request via the control device to purchase a lottery ticket;

receive an identification of a specific lottery via the control device; and submit the request to purchase the lottery ticket to a transaction server.

4. The system of claim 1, wherein the content processing device is a set top box.

5. The system of claim 1, further comprising:

a data server that provides the data; and a video head end that provides the video signal.

6. The system of claim 5, wherein the data server provides the data through a packet switched network and the video head end provides the video signal through a video distribution network that includes coaxial cables.

7. The system of claim 5, the content processing device further being configured to display the widget based in part on a predetermined order of displaying categories of information.

8. The system of claim 1, wherein the content processing device requests that the data include a list of items including at least one of lottery tickets, tickets to a sporting event, movie tickets, and theater tickets.

9. A method, comprising:

receiving a request for a widget in a content processing device via a control device;

determining whether computer executable instructions for providing the widget are stored locally in a computer readable medium within the content processing device;

downloading computer executable instructions for providing the widget when the instructions are not stored locally, the instructions being downloaded from a remote computing device via a network;

receiving an incoming video signal in the content processing device;

requesting lottery information from a remote computing device, the request including location information associated with the content processing device;

verifying access to the lottery information based in part on a list of authorized users;

providing a data signal including the data from the content processing device to the video display, wherein the video display displays a data interface including the lottery information, the video display displaying images representing the video signal in a first portion of the video display and the lottery information including lottery results and an option to purchase lottery tickets in a second portion of the video display, wherein the option to purchase lottery tickets is displayed while the lottery results are displayed; and then receiving a request to purchase at least one item associated with the lottery information listed in the data.

10. The method of claim 9, wherein a fiber optic cable is used to transmit the data and the video signal to the content processing device.

11. The method of claim 9, further comprising:

receiving a request via the control device to purchase a lottery ticket;

receiving an identification of a specific lottery via the control device; and submitting the request to purchase the lottery ticket to a transaction server.

12. The method of claim 11, further comprising receiving a purchase confirmation from the transaction server according to pre-stored information as part of at least one of the content processing device, the transaction server, or a transaction database.

13. The method of claim 9, wherein the request to purchase includes payment information.

14. The method of claim 9, wherein a data server provides the data and a video head end provides the video signal.

15. The method of claim 14, wherein the data server provides the data through a packet switched network and the video head end provides the video signal through a video distribution network that includes coaxial cables.

16. The method of claim 9, further comprising displaying the widget based in part on a predetermined order of displaying categories of information.

17. The method of claim 9, further comprising requesting that the data include a list of items including lottery tickets.

18. The method of claim 9, tangibly embodied on a computer-readable medium as computer-executable instructions, wherein the medium is not a signal.

19. The method of claim 9, wherein the content processing device is further configured to:

receive a prompt for a specific lottery drawing on a specific date via the control device;

receive a request via the control device to purchase a lottery ticket for the specific lottery drawing; and submit the request to a transaction server, wherein the transaction server is further configured to charge the purchase to an account associated with the content processing device.

20. A system, comprising:

a packet switched network;

a video distribution network that includes coaxial cable;

fiber optic cable;

a gateway router that connects the packet switched network and the video distribution network to the fiber optic cable;

a video head end that selectively provides a video signal via the video distribution network;

a transaction server that communicates through the packet-switched network and that selectively receives requests to purchase at least one item and that selectively provides a purchase confirmation and further that selectively provides data including at least one item available for purchase;

a broadband home router that selectively receives the data and the video signal via the fiber optic cable;

a content processing device that is connected to the broadband home router and that is configured to receive both the data and the video signals;

a control device in selective communication with the content processing device, whereby a user may request data and video content; and a video display that selectively receives a data signal including the data from the content processing device, whereby the video display displays images representing the video signal in a first portion of the video display and a data interface including at least a subset of the data, the subset of data including a listing of items available for purchase, in a second portion of the video display;

wherein the content processing device is further configured to:
  receive a request for a widget via the control device;
  determine whether computer executable instructions for providing the widget are stored locally in a computer readable medium;
  download computer executable instructions for providing the widget when the instructions are not stored locally, the instructions being downloaded from a remote computing device via the network;
  provide a menu of user-selectable options from the widget to the video display along with images representing the television programming, the menu of user-selectable options including an option to access lottery services;
  receive a selection of the option to access lottery services via the control device;
  request lottery information from a remote computing device, the request including location information associated with the content processing device;
  verify access to the lottery information based in part on a list of authorized users;
  receive lottery information from the remote computing device in response to the request, the lottery information including lottery results and an option to purchase lottery tickets;
  display the option to purchase lottery tickets while the lottery results are displayed;
  receive a request to purchase a lottery ticket; and
  submit the request to the transaction server, and the transaction server is further configured to selectively charge the purchase of the lottery ticket to an account associated with the content processing device.

21. The system of claim 20, wherein the video display receives the incoming video signal from the content processing device and displays a video image together with the data interface.

* * * * *